United States Patent
Hochwarth et al.

(10) Patent No.: US 12,080,178 B2
(45) Date of Patent: Sep. 3, 2024

(54) METHOD AND SYSTEM FOR SYNCHRONIZING A FLIGHT MANAGEMENT SYSTEM WITH AN EXTERNAL DEVICE

(71) Applicant: GE AVIATION SYSTEMS LLC, Grand Rapids, MI (US)

(72) Inventors: Joachim Karl Ulf Hochwarth, Caledonia, MI (US); Freda Mae Diemer, Wyoming, MI (US); Thomas Craig Clinger, Grand Rapids, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

(21) Appl. No.: 18/455,331

(22) Filed: Aug. 24, 2023

(65) Prior Publication Data

US 2023/0401965 A1    Dec. 14, 2023

Related U.S. Application Data

(63) Continuation of application No. 16/682,729, filed on Nov. 13, 2019, now Pat. No. 11,783,714.

(51) Int. Cl.
  *G08G 5/00* (2006.01)
  *H04W 72/21* (2023.01)

(52) U.S. Cl.
  CPC ......... *G08G 5/0039* (2013.01); *G08G 5/0013* (2013.01); *H04W 72/21* (2023.01)

(58) Field of Classification Search
  CPC .. G08G 5/0039; G08G 5/0013; G08G 5/0021; G08G 5/0052; G08G 5/003; G08G 5/0073; H04W 72/1284
  See application file for complete search history.

(56) References Cited

U.S. PATENT DOCUMENTS 6,271,866 B1   8/2001  Hancock et al.
6,438,468 B1   8/2002  Muxlow et al.
              (Continued)

FOREIGN PATENT DOCUMENTS

CN    101932997 A    12/2010
CN    103731331 A    4/2014
              (Continued)

OTHER PUBLICATIONS pandas0.23.1documentation»APIReference»Pandas. DataFrame,RetrievedonlineDec. 17, 2022,<URL:httos://web.archive.org/web/20180707225343/https://pandas.pydata.org/pandas-docs/version/0.23/generated/pandas.DataFrame.html,DatedJul. 7, 2018 (Year: 2018).*

*Primary Examiner* — Shon G Foley
(74) *Attorney, Agent, or Firm* — McGarry Bair PC

(57) ABSTRACT

A method of transmitting a set of conforming data frames within an avionics system. The avionics system including a Flight Management System (FMS) and an avionics device. The method including generating, via the avionics device, at least one specialized message, transmitting, via the avionics device, the at least on specialized message, generating, via the avionics device, the set of conforming data frames, and transmitting, via the avionics device, at least a subset of the set of conforming data frames. The method comprising receiving, via the FMS, at least one transmission including at least one of the specialized header frame or the set of conforming data frames from the avionics device.

20 Claims, 4 Drawing Sheets

(56) References Cited

U.S. PATENT DOCUMENTS

| | | |
|---|---|---|
| 7,908,042 B2 | 3/2011 | Brinkley et al. |
| 7,970,410 B2 | 6/2011 | Brinkley et al. |
| 8,364,328 B2 | 1/2013 | Hedrick |
| 8,515,658 B1 | 8/2013 | Foster et al. |
| 8,948,933 B2 | 2/2015 | Pangilinan et al. |
| 9,061,770 B2 | 6/2015 | Johnson et al. |
| 9,709,982 B2 | 7/2017 | Mere et al. |
| 9,731,815 B2 | 8/2017 | Pangilinan et al. |
| 10,089,886 B2 | 10/2018 | Kawalkar et al. |
| 10,162,514 B2 | 12/2018 | Shapiro et al. |
| 2009/0265393 A1 | 10/2009 | Yukawa et al. |
| 2016/0125743 A1 | 5/2016 | Shorter, Jr. et al. |
| 2016/0328978 A1 | 11/2016 | Ramaker et al. |
| 2018/0357030 A1 | 12/2018 | Fairchild |
| 2018/0365265 A1 | 12/2018 | Blanc et al. |
| 2019/0152619 A1 * | 5/2019 | Mohan ................ G08G 5/0021 |

FOREIGN PATENT DOCUMENTS

| | | | |
|---|---|---|---|
| CN | 103971545 A | 8/2014 | |
| CN | 104683142 A | 6/2015 | |
| CN | 105425252 A | 3/2016 | |
| EP | 3136318 A1 | 3/2017 | |
| EP | 3287963 A1 * | 2/2018 | ............... B64F 5/00 |
| EP | 3486848 A1 | 5/2019 | |
| EP | 3489783 A1 | 5/2019 | |
| EP | 3511923 A1 | 7/2019 | |

* cited by examiner

80

Sequence Number:
*SN123* — 82

Status: *Insufficient Fuel Levels*
Request: *Retransmit* — 84

Description: — 86
*FPN/RP:
DA:KSTL:AA:ESSA:R:30R:D:NATCA2.SPI:F:SPI,N39504W089407.J35.OBK.J547.FNT.Q824.LETAK.Q848.DICEN..PN,N49503W064232...JANJO,N54020W057000..5650N,N56000W050000..5840N,N58000W040000..6030N,N60000W030000..6120N,N61000W020000..6210N,N62000W010000..INGAL,N62261W000000.Z267. ROV PA.Z15.ELTOK:A:ELTO6P.ELTOK*

FIG. 3

METHOD AND SYSTEM FOR SYNCHRONIZING A FLIGHT MANAGEMENT SYSTEM WITH AN EXTERNAL DEVICE

CROSS-REFERENCE TO RELATED APPLICATION(S)

This application is a continuation U.S. patent application Ser. No. 16/682,729, filed Nov. 13, 2019, now U.S. Pat. No. 11,783,714, issued Oct. 10, 2023, which is incorporated herein by reference in its entirety.

TECHNICAL FIELD

This disclosure relates generally to a synchronization system for a flight management system, and more specifically to a system where the flight management system and the electronic flight bag can have two-way communication.

BACKGROUND

In an effort for airspace modernization, air traffic management is being modernized to leverage emerging technologies and aircraft navigation capabilities. Aircraft navigation can utilize high-accuracy Global Navigation Satellite System (GNSS) (e.g., Global Positioning System (GPS) or Galileo) or, modern Flight Management Systems (FMSs) and Flight Control Systems (FCSs).

During flight operations, the flight crew can perform flight management tasks through use of an Electronic Flight Bag (EFB). The EFB can allow for flight crews to input, and automatically update or monitor information concerning the operation of the aircraft such as, but not limited to, the flight plan, weather conditions, flight delays, fuel status, route changes, operation manuals, surveillance, or accident/incident reports.

BRIEF DESCRIPTION

The disclosure relates to a method for synchronization of information between a flight management system (FMS) and a receiving unit, the method comprising receiving, at the receiving unit, an uplink transmission of data from the FMS, the uplink transmission of data including a sequence number, attempting to load a portion of the uplink transmission of data into a flight plan of the receiving unit, determining if the attempt to load was successful, generating a status message related to the determining and wherein the status message is associated with the sequence number, and outputting the sequence number and the status message related to the sequence number, and flying an aircraft according to the flight plan.

In another aspect, the disclosure relates to an avionics system, comprising an electronic flight bag (EFB) having a processor and communication link, and configured to, generate at least one specialized message including multiple labels within the specialized message, transmit at least one specialized header frame to a data network, generate a set of conforming data frames, wherein each of the set of conforming data frames is indicated as one of the sets of conforming data frames by a single bit indicator, and transmit at least a subset of the conforming data frames to the data network, and a flight management system (FMS), configured to, receive a transmission of data from the EFB, attempt to load a portion of the transmission into a flight plan of the FMS, determine if the load was successful, generate a status message related thereto, and periodically output groups of data including a sequence number and a status message related to the sequence number.

BRIEF DESCRIPTION OF THE DRAWINGS

In the drawings:

FIG. 3 is a schematic diagram of a message displayed from the EFB indicating failed execution of a message, according to aspects described herein.

DETAILED DESCRIPTION

Figure 1:
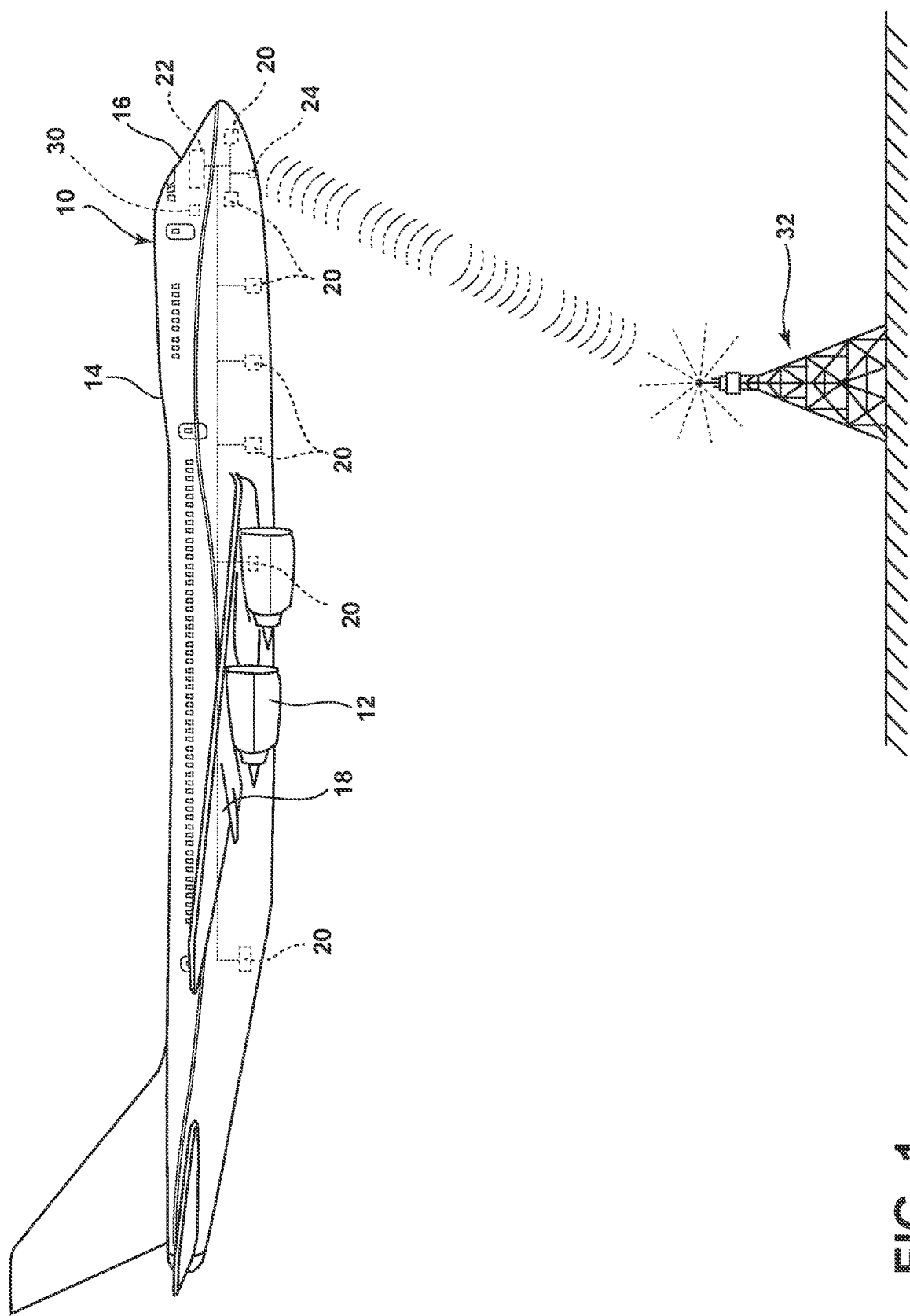
FIG. 1 is a schematic illustration of an aircraft that can include an EFB and an FMS according to aspects described herein.

Aspects of the present disclosure relate to providing a method for synchronizing information in an FMS with a receiving unit. The receiving unit can be defined to be one or more of an EFB, an Air Traffic Controller (ATC), or a Air Operations Center (AOC). Additionally, the communication between the FMS and the receiving unit is bidirectional such that the flight crew can input information (e.g., a flight path) directly into the FMS and the synchronization status will remain intact. The uplink transmission from the receiving unit can attempt to load a portion of a flight plan to the FMS, and further determine if the load was successful. The FMS can then generate a status method based, at least, in part of the attempt to load the uplink transmission. The FMS can produce an output transmission to a computer of the aircraft. The computer can use the information from the FMS to fly the aircraft according to a predetermined, or input flight plan.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection or communicative connection between respective elements. Furthermore, as used herein, the term "set" or a "set" of elements can be any number of elements.

As used herein, a "controller" or "controller module" can include a component configured or adapted to provide instruction, control, operation, or any form of communication for operable components to affect the operation thereof. A controller module can include any known processor, microcontroller, or logic device, including, but not limited to: Field Programmable Gate Arrays (FPGA), an Application-Specific Integrated Circuit (ASIC), a Full Authority Digital Engine Control (FADEC), a Proportional Controller (P), a Proportional Integral Controller (PI), a Proportional Derivative Controller (PD), a Proportional Integral Derivative Controller (PID), a hardware-accelerated logic controller (e.g. for encoding, decoding, transcoding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller module can also include a data storage component accessible by the processor, including memory, whether transition, volatile or non-transient, or non-volatile memory. Additional non-limiting examples of the memory can include Random Access Memory (RAM), Read-Only Memory (ROM), flash memory, or one or more different types of portable electronic memory, such as discs, DVDs, CD-ROMs, flash drives, Universal Serial Bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to affect a functional or operable outcome, as described herein.

The exemplary drawings are for purposes of illustration only and the dimensions, positions, order and relative sizes reflected in the drawings attached hereto can vary.

FIG. 1 is a schematic illustration of an aircraft 10 that can include an EFB 30, and an FMS 8. The aircraft 10 can include one or more propulsion engines 12 coupled to a fuselage 14. A cockpit 16 can be positioned in the fuselage 14 and wing assemblies 18 can extend outwardly from the fuselage 14. Further, a set of aircraft systems 20 that enable proper operation of the aircraft 10 can be included as well as one or more controllers or computers 22, and a communication system having a communication link 24. While a commercial aircraft has been illustrated, it is contemplated the aircraft 10 can be any type of aircraft, for example, without limitation, fixed-wing, rotating-wing, personal aircraft, and the like.

The set of aircraft systems 20 can reside within the cockpit 16, within the electronics and equipment bay (not shown), or in other locations throughout the aircraft 10 including that they can be associated with the propulsion engines 12. Such aircraft systems can include but are not limited to an electrical system, an oxygen system, hydraulics or pneumatics system, a fuel system, a propulsion system, flight controls, audio/video systems, an Integrated Vehicle Health Management (IVHM) system, and systems associated with the mechanical structure of the aircraft 10.

The computer 22, can be operably coupled to the set of aircraft systems 20. The computer 22 can aid in operating the set of aircraft systems 20 and can receive information from the set of aircraft systems 20 and the communication link 24. The computer 22 can, among other things, automate the tasks of piloting and tracking the flight plan of the aircraft 10. The computer 22 can also be connected with other controllers or computers of the aircraft 10 such as, but not limited to, an FMS 8 (not shown).

Any number of sensors (not shown) or other aircraft systems 20 can be communicatively or operably coupled to the computer 22. The sensors can provide or receive information to or from the computer 22.

The EFB 30 can be a handheld user interface such as a tablet, phone, Personal Digital Assistant (PDA), or pager. Alternatively, the EFB 30 could be a stationary interface built into a portion of the aircraft 10 for use by the flight crew. The EFB 30 can be preloaded with flight procedure information such as, but not limited to, a flight plan, weather patterns, fuel levels, or any other information concerning the operation of the aircraft 10. During operation of the aircraft 10, the flight crew can link the EFB 30 with the computer 22 via a communication link 24 in order to transfer the information between the EFB 30 and the computer 22.

The communication link 24 can be communicably coupled to the computer 22 or other processors of the aircraft to transfer information to and from the aircraft 10. It is contemplated that the communication link 24 can be a wireless communication link and can be any variety of communication mechanism capable of wirelessly linking with other systems and devices and can include, but is not limited to, satellite uplink, SATCOM internet, VHF Data Link (VDL), Aircraft Communications Addressing and Reporting System (ACARS network), Aeronautical Telecommunication Network (ATN), Automatic Dependent Surveillance-Broadcast (ADS-B), Wireless Fidelity (WiFi), WiMax, 3G wireless signal, Code Division Multiple Access (CDMA) wireless signal, Global System for Mobile Communication (GSM), 4G wireless signal, Long Term Evolution (LTE) signal, or any combinations thereof. It will also be understood that the particular type or mode of wireless communication is not critical, and later-developed wireless networks are certainly contemplated. Further, the communication link 24 can be communicably coupled with the computer 22 through a wired link. Although only one communication link 24 has been illustrated, it is contemplated that the aircraft 10 can have multiple communication links communicably coupled with the computer 22. Such multiple communication links can provide the aircraft 10 with the ability to transfer information to or from the aircraft 10 in a variety of ways.

As illustrated, the computer 22 can communicate with the AOC) 32 or the ATC 33 via the communication link 24. The AOC 32 can a ground facility which can communicate directly with the FMS 8 or indirectly with the EFB 30 the aircraft 10. The ATC 33 can be any type of ATC 33 such as one operated by an Air Service Navigation Provider (ANSP) and/or ATC 33. The computer 22 can request and receive information from the designated AOC 32 or the designated ATC 33 can send a transmission to the aircraft 10.

Figure 2:
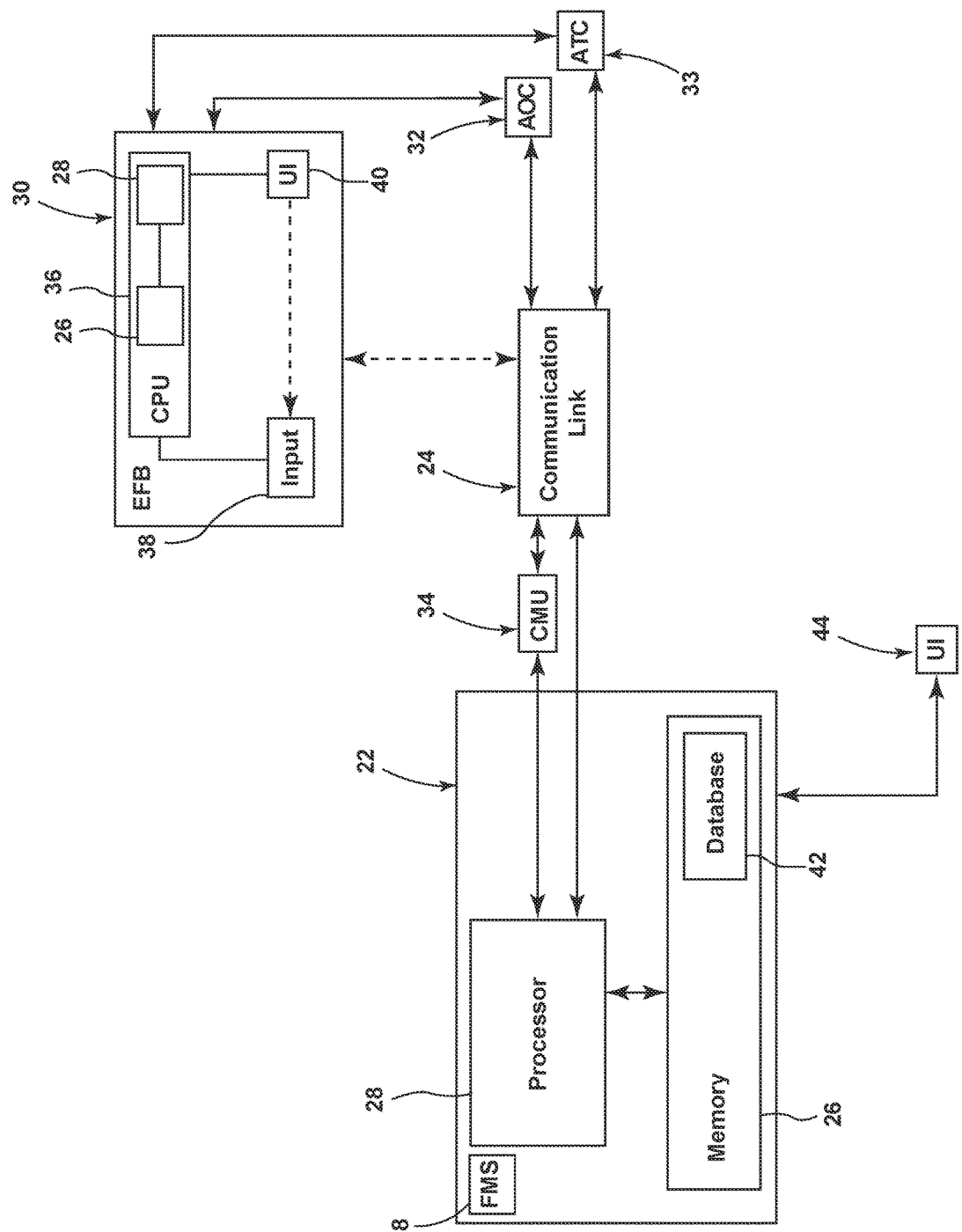
FIG. 2 is a block diagram of a communication link between the EFB and FMS that can be utilized with the aircraft of FIG. 1, according to aspects described herein.

FIG. 2 is a schematic representation of the communication link 24 between the EFB 30 and the computer 22. The computer 22 can be operatively coupled to the FMS 8 of the aircraft 10. The computer 22 can form a portion of the FMS 8 or the FMS 8 can form a portion of the computer 22. The FMS 8 can be provided with the computer 22. Alternatively, the FMS 8 can be a separate component operable to communicate with the computer 22 via an FMS communication link (not shown) similar to the communication link 24.

The computer 22 can further include a memory 26. The memory 26 can be RAM, ROM, flash memory, or one or more different types of portable electronic memory, such as discs, DVDs, CD-ROMs, etc., or any suitable combination of these types of memory.

The computer 22 can include one or more processors 28, which can be running any suitable programs. The computer 22 can include various components (not shown) described herein. The computer 22 can include or be associated with any suitable number of individual microprocessors, power supplies, storage devices, interface cards, auto flight systems, flight management computers, and other standard components and that the computer 22 can include or cooperate with any number of software programs (e.g., flight management programs) or instructions designed to carry out the various methods, process tasks, calculations, and control/display functions necessary for operation of the aircraft 10. By way of non-limiting example, a navigation system including a GNSS receiver configured to provide data that is typical of GPS systems, such as the coordinates of the aircraft 10 can be coupled with the computer 22. Position estimates provided by the GNSS receiver can be replaced or augmented to enhance accuracy and stability by inputs from other sensors, such as inertial systems, camera and optical sensors, and Radio Frequency (RF) systems (none of which are shown for the sake of clarity). Such navigation data may be utilized by the FMS 8 for various functions, such as to navigate to a target position.

A database component 42 can be provided in the memory 26. The database component 42 can be an internal component of the computer 22 which includes various sets of data. It will be understood that the database component 42 can be any suitable database, including a single database having multiple sets of data, multiple discrete databases linked together, or even a simple table of data. It is contemplated that the database component 42 can incorporate a number of databases or that the database can actually be a number of separate databases. The database component 42 can be a Navigation Database (NDB) containing information including, but not limited to, airports, runways, airways, waypoints, navigational aids, airline/company-specific routes, and procedures such as Standard Instrument Departure (SID), Standard Terminal Approach Routes (STAR), and approaches. The database component 42 can alternatively include memory in the FMS 8 containing a flight plan.

The flight plan, and other flight procedure information can be supplied to the aircraft 10 via the EFB 30. The EFB 30 can include various components such as a controller module 36, and a User Interface (UI) 40. The controller module 36 can be configured to automatically perform the calculations, determinations, executions, and transmissions of the FMS 8. The controller module 36 can be configured to run any suitable programs or executable instructions designed to carry out various methods, functionality, processing tasks, calculations, or the like, to enable or achieve the technical operations or operations described herein.

It is contemplated that the UI 40 can include a screen. However, the UI can include any one or more of an indicator lights, a buzzer or any other known interface. The flight crew can alternatively use the UI 40 to input data through an input 38. The input 38 can be a set of data the flight crew wants to input or a password. The UI 40 can alternatively indicate a synchronization status to the flight crew between the EFB 30 and the FMS 8.

The data from the FMS 8 can be displayed via a second UI 44. The second UI 44 can be any one or more of a screen, an indicator light, an audio, a buzzer or any other known interface. The second UI 44 can display to the flight crew the processed data of the FMS 8, or notify the crew of any potential non-compliant commands or error codes.

During operation, the flight crew can link the EFB 30 with the FMS 8 via a communication link 24. The EFB 30 can upload flight plan information to the FMS 8 via an AOC 32. The AOC 32 and the EFB 30 can utilize a two-way communication to exchange one or more performance parameters or the flight plan. As used herein, the performance parameter can be defined as various operating parameters of the aircraft 10 which can be used to determine a flight path based on the flight plan.

Additionally, or alternatively, the ATC 33 can be used with the AOC 32 to communicate with the aircraft 10. The communication with the ATC 33 can be preferable over the AOC 32 in some instances. For example, the EFB 30 can send a clearance request to the ATC 33. The clearance request can be a request from the EFB 30 to execute or perform the input flight plan.

The EFB 30 can produce an uplink transmission of data to be received by the FMS 8. The uplink transmission can include the flight procedure information described herein, or any flight crew input. The uplink transmission can be packaged at either a data source defined by one or more sensors, the EFB 30, or the FMS 8. The uplink includes, at least, a specialized header frame (not shown), a conforming data frame (not shown), or a single-bit indicator (SBI) (not shown). Each of the specialized header frame, conforming data frame, or SBI can be transmitted and packaged within the uplink transmission over a data network (not shown).

The data network can be any transmission line between the FMS 8 and the EFB 30 with packages of data being transferred thereon. The specialized header frame can include identification information of the packaged data that can allow a data destination, such as the FMS 8, to identify the source of the data and the package data therein. The conforming data frame can be defined by the data that was identified at a data destination by the respective specialized header frame. The data is considered to be conforming when it has been previously identified by the specialized header frame, and is received or transmitted during a respective time slot. The time slot can be any real range of time that the FMS 8 or any other data destination or source can allocate for a single frame of data to be sent or received. The time slot can be restricted by the size and rating of the system. For example, the system can be an ARINC 429 (A429) system that can be rated at using 32-bit frames that can each utilize the time slot of 100 ms. Alternatively, the system can be any ARINC-specification or known aviation system. In the case of multiple frames of data being sent over multiple time slots, it can be beneficial to utilize the SBI to easily identify if a data frame is conforming or non-conforming. The SBI can most simply be a binary identifier.

The CMU 34 can automatically select transmission media that can include Very High Frequency (VHF), High Frequency (HF), or Satellite Communications (STACOM) systems. The CMU 34 can be used for timing purposes of a set of periodic data defined by data that is sent or received by the FMS 8 or other processing components of the aircraft 10 during a predetermined time slot. For example, multiple uplink transmissions can be sent to the FMS 8 to be processed, however, the FMS 8 can request that each uplink transmission be received only at a certain time slot. The CMU 34 can receive the incoming data transmissions and ensure that they are delivered to the FMS 8 within the appropriate time slot. Further, the CMU 34 can ensure that only conforming data frames are being sent or received by the FMS 8. The conforming data frame can be defined by data that matches the current request or expectation of the FMS 8. Alternatively, data can be transferred between the data source, or the EFB 30 and the FMS 8 without using the CMU 34. It will be appreciated that in this instance, functions of the CMU 34 such as conformity, timing, or transmission frequency can be done by the EFB 30, or the FMS 8.

It will be appreciated that the above communication between the FMS 8 and the EFB 30 can be bidirectional. The FMS 8 can request one or more uplink transmissions from the EFB 30. Additionally, or alternatively, the FMS 8 can receive transmissions from the EFB 30. The FMS 8 can request for an uplink transmission to the EFB 30 by sending a request transmission to the EFB 30. Additionally, the FMS 8 can, in some instances, send a downlink to the EFB 30 based off of the uplink transmission. The downlink can be a transmission from the FMS 8 which provides an edit of the uplink transmission received by the FMS 8 to the EFB 30.

FIG. 3 illustrates a schematic diagram of the status message 80 that can be sent from the FMS 8 in response to a corresponding uplink transmission from the EFB 30. The status message 80 can include a sequence number 82, a status identifier 84, or a description 86.

The uplink transmission from the EFB 30 can be assigned a sequence number 82 to easily identify the uplink transmission. The sequence number 82 can be alphanumeric. For example, SN123. Alternatively, the sequence number 82 can be only alphabetic numerals, or real numbers.

The status identifier 84 of the status message 80 can indicate various conditions of the uplink transmission. The status identifier 84 can be based off of a previous status message or uplink transmission received by the FMS 8. The FMS 8 can send the EFB 30 the status message 80 with the status identifier 84 to indicate the status of the uplink transmission. For example, the uplink transmission can be rejected or failed. In such an instance, the FMS 8 can indicate this failure in the status identifier 84. As such, the EFB 30 or the flight crew can read this status identifier 84 and respond accordingly. One of the responses could be, for example, a request for retransmission of the uplink transmission to the FMS 8. Alternatively, the status identifier 84 can indicate the uplink transmission was accepted and executed properly. As used herein, the term "execute" can be defined as the portion of the uplink transmission or other inputs which are properly carried out or performed by the FMS 8.

It is contemplated that the uplink transmission can be partially rejected. As such, the FMS 8 will execute the portion of the uplink transmission which did not fail and indicate the execution of the non-failed parts in the status message 80. The partially rejected portions of the uplink transmission, however, will not be executed and the FMS 8 will indicate and outline this partial rejection in the same or subsequent status message 80.

The request for retransmission of the uplink transmission can be done in response to an input destination that is outside the boundary of what the aircraft 10 can reach with the current fuel levels. In this case, the status identifier 84 can read "insufficient fuel levels". The status identifier 84 can read one or more error messages. The error messages can indicate an error in the input (e.g., the command/input/data from the flight crew contains a flaw), there is insufficient time to run the input, the input failed to load, a retransmit request, an invalid reference point, a procedure is incompatible, the aircraft 10 is unable to cruise at an altitude which was input, there is a vertical disco that exists, an identified airway has no exit point, there is non-conforming data, or an there is an invalid waypoint or destination in the input. Alternatively, the status identifier 84 can inform the EFB 30 that the previous status message was accepted and the required processing was performed. In the case of an accepted uplink transmission, a positive transfer signal can be generated to notify the flight crew of an accept uplink transmission. For example, in the instance of a positive transfer signal after the input of a reference point from the EFB 30, the status message 80, and more specifically the status identifier 84, can read "valid reference point". Both the status identifier 84 of an accepted and a rejected uplink transmission can be used by the flight crew and the EFB 30 to ensure that the periodic and aperiodic data of the EFB 30 has been properly executed and if it had not, proper action by the flight crew or EFB can be taken. It will be appreciated that there can be many status messages 80 with different status identifiers 84, it can be dependent on the uplink transmission and the data contained within.

The status message 80 can further include the description 86 tied to the sequence number 82. The description 86 can include specific information relating to the status message and the uplink transmission such as, but not limited to, a waypoint, an airway or flight procedure information.

The description 86 of the status message 80 can detail the specifics of the status identifier 84. For example, the status identifier 84 indicates the uplink transmission as failed the FMS 8 can automatically send the EFB 30 the status message 80 that can include the description 86 indicating why the transmission failed. Alternatively, the EFB 30 can request the FMS 8 send a description 86 alongside the status message 80 to provide a detailed description of why the uplink transmission failed. It will be appreciated that the status identifier 84 can further indicate the uplink transmission as accepted by the FMS 8. As such, when the uplink transmission is accepted, the FMS 8 can send the status message 80 without the description 86. If the EFB 30, however, requires the description 86, the EFB 30 can request the description 86 be sent in a subsequent or separate status message 80.

The FMS 8 can periodically send out identical status messages 80 to the FMS 8 to indicate a continued synchronization between the FMS 8 and the EFB 30. A positive transfer signal can indicate synchronization between the FMS 8 and the EFB 30. Synchronization can be indicated in the status message 80 by including the sequence number 82 and status identifier 84 indicating the accepted uplink transmission. Conversely, the FMS 8 can periodically indicate a non-synchronization status by periodically sending out a status message 80 indicating the uplink transmission was not accepted. In this case, the EFB 30 can read the description 86, or request the description 86 from the FMS 8 to determine why the uplink transmission has failed. Additionally, or alternatively, the uplink transmission can be initially accepted by the FMS 8 to indicate the synchronization with the EFB 30. However, subsequent status messages 80 can indicate the uplink transmission is no longer accepted by the FMS 8 and indicate the non-synchronization status to the EFB 30.

The FMS 8 can further periodically send out the status messages 80 of two or more uplink transmissions during a set time frame (e.g., 1 second) in a single status package. For example, the FMS 8 can send via downlink the status package during the set time frame, where the status package includes the statuses of up to ten different uplink transmissions. Each of the status packages can include at least the sequence number 82 and the status identifier 84 currently attributed to the uplink transmission. The EFB 30 can hold in the memory 26 the sequence number 82, the status identifier 84, and the description 86 of the status messages 80 it receives. When the EFB 30 receives the status package, it can compare the sequence number 82 with the status messages 80 in memory 26. It can then decide which of the status identifiers 84 of the status package apply to which of the status messages 80 in memory 26 of the EFB 30. The EFB 30 can then overwrite portions of the exiting status message 80 depending on the changes it notices (e.g., if a previous status identifier 84 was "failed" and a new status identifier 84 indicated in the status package is "accepted", the EFB can replace the status identifier 84 of the status message 80 in memory 26 with "accepted" instead of "failed"). In other words, the EFB 30 can read the entire status package and use the sequence numbers 82 to determine which status identifier 84 goes with which uplink transmission. The EFB 30 can then ensure proper synchronization with the FMS 8 by knowing the status of each of the uplink transmissions. It is contemplated that the FMS 8 will only be able to transmit ten different statuses within the set time frame in a single status package. As such, the FMS 8 can overwrite old status messages 80 of a previously sent uplink transmission in the status package to clear space for other or newer status messages 80. If the EFB 30 determines that it still needs the status of the previously sent, and subsequently overwritten uplink transmission, the EFB 30 can send a request to the FMS 8 for transmission of the status message 80 of the overwritten uplink transmission.

A version counter (not shown) can be transmitted by the FMS 8 either periodically or upon request from the EFB 30. The version counter can be a log of changes to the uplink transmission done directly through the FMS 8. The version counter can be defined as data package from the FMS 8 to the EFB 30 which indicates any changes done to the flight plan through the FMS 8. The version counter can log information such as, but not limited to, the time the changes were made, the changes themselves, or the number of changes. As a non-limiting example, the changes can be direct alterations to the flight plan by one or more of the flight crew, the AOC 32 or the ATC 33. These changes are done by directly inputting alterations directly to the FMS 8. These changes can be logged in the version counter and be sent to the EFB 30 either periodically or aperiodically (e.g., EFB 30 requests transmission of the version counter).

The version counter can be used to ensure the proper synchronization between the FMS 8 and the EFB 30. For example, in some instances the EFB 30 will be running in the background and not actively listening for transmissions from the FMS 8. As such, the EFB can miss transmissions from the FMS 8 which can indicate a change to the flight plan. The EFB 30, however, needs to become aware of changes to the flight plan in order to ensure synchronization. As such, the EFB 30 can either send a request to the FMS 8 to transmit the version counter or the EFB 30 can actively listen for the version counter during a time coinciding with a periodic schedule of when the FMS 8 will send the version counter. The use of the version counter allows for the EFB 30 to monitor changes done through the FMS 8 without requiring the FMS 8 to actively listen for transmissions form the EFB 30 at all times.

Figure 4:
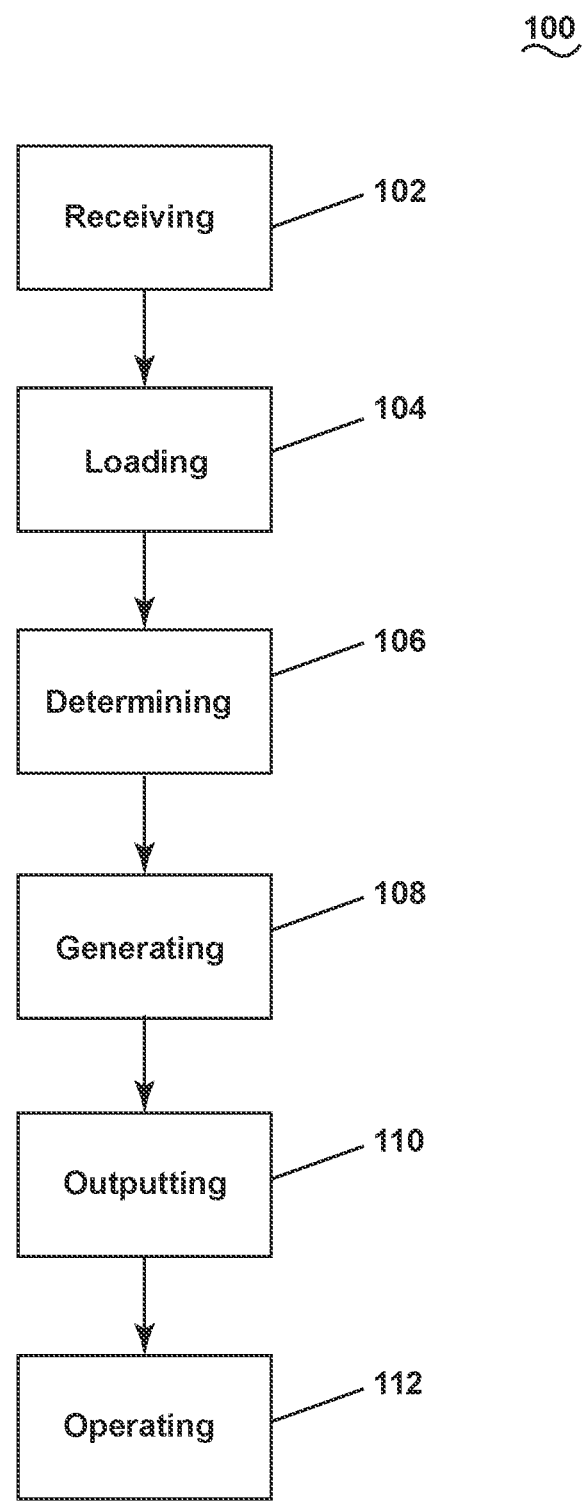
FIG. 4 is a flowchart showing a method for synchronizing information in an FMS, according to aspects described herein.

FIG. 4 is a flowchart illustrating a method 100 for synchronizing information between the FMS 8 and the EFB 30. The FMS 8 can receive the uplink transmission that can include the sequence number 82 from the EFB 30, at 102. The FMS 8 can then attempt to load at least a portion of the uplink transmission, at 104. The FMS 8 can determine if the attempt to load at least the portion of the uplink transmission was successful, at 106. The FMS 8 can generate a status message 80 associated to the sequence number 82, at 108. The uplink transmission including the status message 80 and the sequence number 82 can then be output to respective aircraft systems 20, at 110. The data output to the aircraft systems 20 can aid in the flying of the aircraft 10 according to the flight plan at 112.

The sequence depicted is for illustrative purposes only and is not meant to limit the method 100 in any way as it is understood that the portions of the method can proceed in a different logical order, additional or intervening portions can be included, or described portions of the method can be divided into multiple portions, or described portions of the method can be omitted without detracting from the described method.

As an example, when the uplink transmission includes a waypoint with duplicate identifiers in the NDB and the uplink transmission does not include location information to define which of the duplicate identifiers is requested, the status message 80 would indicate the identifier could not be resolved and the EFB 30 should retransmit with either a new waypoint, or location information to define which of the duplicate identifiers is requested. This example can require the method 100 to include the request from the FMS 8 to the EFB to retransmit the new waypoint, or the information to identify the specific instance of the duplicate identifier is requested. Additionally, the status message 80 could include an order list based on the flight plan information of the potential instances of a duplicate identifier for the waypoint in the NBD for the EFB 30 to resolve.

As another example, when the uplink transmission is for a specific airway, the waypoint to connect to the airway needs to be specified. In this instance, the status message from the FMS 8 can indicate that the airway could not be determined and that the EFB 30 should retransmit with the necessary waypoint information to connect to the airway. This example can require the method 100 to include the request from the FMS 8 to the EFB 30 to retransmit the uplink transmission with the necessary waypoint information to connect to the airway. Additionally, the status message 80 can include an ordered list as to possible waypoints to enter the airway based on where the departure procedure or preceding route ends.

As another example, when the EFB 30 sends the uplink transmission with the waypoint being in reference to another specified point such as the waypoint, a Navigational Aid (navaid), or airport is not found. The reference to the other specified point can be as a bearing or distance. When the reference is not found, the status message 80 to the EFB 30 can indicate that the reference point could not be found in the NDB, and that a valid reference point should be defined via the input 38 of the EFB 30. This can require multiple additional steps to the method 100 such as the request from the FMS 8 for retransmission of the uplink transmission, and a step of inputting aperiodic data from the flight crew through input 38.

As another example, the EFB 30 can generate the uplink transmission having a specific departure procedure to leave a departure airport or a specific arrival procedure to arrive at the destination airport. The specific departure or arrival procedures can postnatally no longer exist, or it can be found that they may be incompatible with the airport information provided. The status message 80 in this instance can indicate that either the procedure is not found or that the procedure is incompatible. The EFB 30 can then be used to correct the situation. This can require the method 100 to further include an indication step to activate the audible or visual indicator of the UI 40, or 44 to indicate to the flight crew of the compatibility or incompatibility of the departure or arrival procedure.

As another example, the EFB 30 can generate the uplink transmission including a specified "TO" waypoint, or a "NEXT" airway without a termination, or exit point. In this case, the FMS 8 can indicate in the status message 80 that the airway was identified to be flown without an exit point form the airway and that the EFB 30 should supply the additionally necessary termination information. This example can require the method 100 to include the request from the FMS 8 to the EFB 30 to retransmit the information with the termination point included.

As another example, the FMS 8 can provide a response to the EFB 30 with a predicted flight plan. The FMS 8 can provide the predicted flight plan in instances where the attempt to load the flight plan was unsuccessful. As such, the FMS 8 can utilize the performance parameters of the aircraft supplied from the EFB 30 to create the predicted flight path. The performance parameters can be provided within unloaded data of the uplink transmission. The status message 80 can then include various prediction results such as, but not limited to, normal FMS 8 detected conditions like unable cruise altitude, insufficient reserve fuel, or vertical disco(continuity) exists. The FMS 8 can return the predicted conditions to the EFB 30 and the EFB 30 can use this information to adjust the flight plan or performance parameters of the flight plan accordingly. This example can require the method 100 to include multiple additional steps such as a prediction step to determine the predicted flight path, and an additional generating step to determine the updated conditions. Alternatively, the flight crew can manually input the updated flight plan. In this case, the FMS 8 can request an updated flight plan from the EFB 30 and the FMS 8 can use the either UI 40, 44 to indicate when the it has updated the predicted flight plan based on the updated flight plan from the flight crew. In this example, the method 100 can further include a requesting step for the FMS 8 to request the updated flight plan from the EFB 30.

As another example, in the instances where the FMS 8 can send a predicted or edited flight plan based on performance parameters, the method 100 can further include a downlinking step. During this step, the FMS 8 can send the edited flight plan and or predicted flight path with the downlink to the EFB 30. From there, the EFB 30 can automatically accept the edits to the flight plan. Alternatively, the flight crew can manually interject into this process to either accept, reject, or further edit the flight plan.

The method steps described herein can be implemented by a program product including machine-executable instructions, such as program codes, for example, in the form of program modules executed by machines in networked environments. Generally, program modules include routines, programs, objects, components, data structures, etc. that have the technical effect of performing particular tasks or implement particular abstract data types. Machine-executable instructions, associated data structures, and program modules represent examples of program codes for executing steps of the method disclosed herein. The particular sequence of such executable instructions or associated data structures represent examples of corresponding acts for implementing the functions described in such steps.

As disclosed herein, the method of the synchronization between the FMS 8 and the EFB 30 is meant to be a non-limiting example of the method of synchronizing the FMS 8 with the receiving unit. It will be appreciated that the EFB 30 can be one or more receiving unit. It is contemplated that the receiving unit can be defined as one or more of the EFB 30, the AOC 32, or the ATC 33. It will be appreciated that the same methods described herein for synchronization between the FMS 8 and the EFB 30 can be applied to the synchronization between the FMS 8 and the AOC 32, or the FMS Band the ATC 33.

Benefits of the present disclosure include the ease of continued synchronization between the FMS and the EFB. It is important that the FMS and EFB be tightly coupled in the sense that either one of them consistently knows the status of the other. In cases where the FMS and the EFB are in the non-synchronization status, the flight crew, or the aircraft systems can be quickly and easily notified of the non-synchronization. As such, the flight crew, or the aircraft systems can proceed to correct the non-synchronization of the FMS and the EFB and ensure synchronization occurs. Alternatively, the flight crew, or the aircraft systems can adjust other parameters such as the flight path to correct the non-synchronization status.

Further, the continued synchronization between the FMS and EFB can reduce work required by the flight crew to change parameters of the flight plan. For example, the flight crew can manually input a change to the flight plan into the FMS. The FMS will then send out the version counter to the EFB such that the EFB can become aware of the changes. Without the synchronization, the flight crew would be required to manually enter the changes to the flight plan into both the EFB and the FMS. Additionally, the flight crew will not need to manually synchronize the EFB and the FMS further yet decreasing the amount of work required by the flight crew.

Further yet, the synchronization between the FMS and the EFB allows for the EFB to only listen for or to the FMS during set time frames. During the time the EFB is not listening to or for the FMS, the EFB can run optimization software. This optimization software can ensure the aircraft runs at peak efficiency. For example, the optimization software can be a fuel/time optimization software which can analyze various performance parameters and the flight plan to determine the most fuel-efficient way to run the aircraft. Additionally, the continued synchronization between the FMS and the EFB ensures that the optimization software can be consistently up to date. For example, if the flight plan is changed in the FMS as disclosed herein, the optimization software will need to know of this change to properly run. Since the FMS and the EFB are continuously synchronized, and the EFB can communicate with the optimization software, the optimization software will be able to know of any changes to the flight plan.

Logical connections to one or more remote computers having processors can be used. Logical connections can include a Local Area Network (LAN) and a Wide Area Network (WAN) that are presented here by way of example and not limitation. Such networking environments are commonplace in office-wide or enterprise-wide computer networks, intranets and the internet and can use a wide variety of different communication protocols. Those skilled in the art will appreciate that such network computing environments will typically encompass many types of computer system configurations, including EFBs, personal computers, hand-held devices, multiprocessor systems, microprocessor-based or programmable consumer electronics, network PCs, minicomputers, mainframe computers, and the like.

Distributed computing environments where tasks are performed by local and remote processing devices that are linked (either by hardwired links, wireless links, or by a combination of hardwired and wireless links) through a communication network can further be used. In a distributed computing environment, program modules can be located in both local and remote memory storage devices.

This written description uses examples to disclose aspects of the disclosure, including the best mode, and also to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

1. A method for synchronization of information between a flight management system (FMS) and a receiving unit, the method comprising receiving, at the receiving unit, an uplink transmission of data from the FMS, the uplink transmission of data including a sequence number, attempting to load a portion of the uplink transmission of data into a flight plan of the receiving unit, determining if the attempt to load was successful, generating a status message related to the determining and wherein the status message is associated with the sequence number, and outputting the sequence number and the status message related to the sequence number, and flying an aircraft according to the flight plan.
2. The method of any preceding clause wherein the receiving unit is an electronic flight bag (EFB).
3. The method of any preceding clause wherein the uplink transmission of data includes a description included with the sequence number.
4. The method of any preceding clause wherein the description includes a waypoint, an airway, or procedure information.
5. The method of any preceding clause wherein when the waypoint has duplicate identifiers the status message includes a retransmit request or an ordered list of potential duplicates.
6. The method of any preceding clause wherein the status message can include one or more error messages.
7. The method of any preceding clause wherein the uplink transmission of data further comprises a status identifier.
8. The method of claim 7 wherein the status identifier is based on a previous status message.
9. The method of any preceding clause wherein, when the attempt to load is unsuccessful, the FMS predicts a flight plan with unloaded data and the status message includes results for the predicted flight plan.
10. The method of any preceding clause wherein the status message can include one or more error messages.
11. The method of any preceding cluase wherein the uplink transmission of data is routed through a Communications Management Unit (CMU) before reaching the FMS.
12. The method of any preceding clause wherein the outputting the sequence number and status message can be transmitted based on a periodic schedule.
13. The method of any preceding clause, further comprising providing at least one of an indication of a synchronization status between the FMS and EFB, a positive transfer signal based on determining the load was successful, or a positive transfer signal based on the status message.
14. The method of any preceding clause further including the receiving unit transmitting a version counter either periodically or upon request of the receiving unit.
15. The method of any preceding clause wherein the version counter can include a log of changes to the flight plan done through the receiving unit and indicate to the receiving unit the changes which were made.
16. An avionics system, comprising an electronic flight bag (EFB) having a processor and communication link, and configured to, generate at least one specialized message including multiple labels within the specialized message, transmit at least one specialized header frame to a data network, generate a set of conforming data frames, wherein each of the set of conforming data frames is indicated as one of the sets of conforming data frames by a single bit indicator, and transmit at least a subset of the conforming data frames to the data network, and a flight management system (FMS), configured to, receive a transmission of data from the EFB, attempt to load a portion of the transmission into a flight plan of the FMS, determine if the load was successful, generate a status message related thereto, and periodically output groups of data including a sequence number and a status message related to the sequence number.
17. The avionics system of any preceding clause wherein the FMS further outputs a description of a failure.
18. The avionics system of any preceding clause wherein the FMS outputs the description periodically or upon a request from the EFB.
19. 19. The avionics system of any preceding clause, further comprising a Communications Management Unit (CMU) operably coupled to the FMS and communicatively coupled to the EFB and wherein the CMU uplinks the data and provides it to the FMS.
20. The avionics system of any preceding clause wherein the FMS is further configured to receive an edit to the flight plan and provide a downlink to the EFB based thereon.

What is claimed is:

1. A method of transmitting a set of conforming data frames within an avionics system, the transmission of the set of conforming data frames being to a flight management system (FMS) from an avionics device, the avionics device being external to the FMS, the method comprising:
    generating, via the avionics device, at least one specialized message including multiple labels within the specialized message;
    transmitting, via the avionics device, at least one specialized header frame to a data network, the at least one specialized header frame including identification information relating to an impending transmission of the set of conforming data frames;
    generating, via the avionics device, the set of conforming data frames, with each respective conforming data frame of the set of conforming data frames being indicated as one of the sets of conforming data frames by a single bit indicator relating the respective conforming data frame to the specialized header frame;
    transmitting, via the avionics device, at least a subset of the set of conforming data frames to the data network;
    receiving, at the FMS, at least one transmission including at least one of the specialized header frame or the set of conforming data frames from the avionics device;

attempting to load, via the FMS, a portion of the at least one transmission into a flight plan of the FMS;

determining, via the FMS, if the load was successful;

generating, via the FMS, a status message related thereto; and periodically outputting, via the FMS, groups of data including a sequence number and a status message related to the sequence number.

2. The method of claim 1, wherein the avionics device is an electronic flight bag (EFB).

3. The method of claim 1, further comprising providing, via transmission of at least a subset of the set of conforming data frames to the data network, a description with the sequence number.

4. The method of claim 3, further comprising providing, via the transmission of at least a subset of the set of conforming data frames to the data network, the description including a waypoint, an airway, or procedure information.

5. The method of claim 4, further comprising:

providing, via the transmission of at least a subset of the set of conforming data frames to the data network, the waypoint with duplicate identifiers; and providing, via the FMS, a retransmit request or an ordered list of potential duplicates, via the status message.

6. The method of claim 4, further comprising providing, via the FMS, the status message including one or more error messages.

7. The method of claim 6, further comprising providing, via the FMS, the status message with a status identifier that is based on a previous status message or uplink transmission previously received by the FMS.

8. The method of claim 1 wherein, further comprising:

if the attempt to load is unsuccessful, predicting, via the FMS, a flight plan with unloaded data; and providing, via the FMS, the status message including results for the predicted flight plan.

9. The method of claim 8, further comprising providing, via the FMS, the status message with one or more error messages.

10. The method of claim 1, further comprising routing, via the avionics device, the transmission of at least a subset of the set of conforming data frames to the data network through a Communications Management Unit (CMU) before being received by the FMS.

11. The method of claim 1, further comprising providing at least one of an indication of a synchronization status between the FMS and avionics device, a positive transfer signal based on determining the load was successful, or a positive transfer signal based on the status message.

12. The method of claim 1, further comprising transmitting, via the FMS, a version counter either periodically or upon request of the avionics device.

13. The method of claim 12, further comprising:

transmitting, via the FMS, the version counter including a log of changes to the flight plan done through the FMS; and indicating, via the avionics device and to the FMS, that the changes which were made.

14. The method of claim 1, further comprising:

receiving, at the FMS, an edit to the flight plan; and providing, via the FMS, a downlink to the avionics device based on the edit to the flight plan.

15. A non-transitory computer readable medium storing a program configured to cause a computer to execute a method of transmitting a set of conforming data frames within an avionics system, the transmission of the set of conforming data frames being to a first avionics device from a second avionics device that is external the first avionics device, the method comprising:

generating, via the second avionics device, at least one specialized message including multiple labels within the specialized message;

transmitting, via the second avionics device, at least one specialized header frame to a data network, the at least one specialized header frame including identification information relating to an impending transmission of the set of conforming data frames;

generating, via the second avionics device, the set of conforming data frames, with each respective conforming data frame of the set of conforming data frames being indicated as one of the sets of conforming data frames by a single bit indicator relating the respective conforming data frame to the specialized header frame;

transmitting, via the second avionics device, at least a subset of the set of conforming data frames to the data network;

receiving, at the first avionics device, at least one transmission including at least one of the specialized header frame or the set of conforming data frames from the avionics device;

attempting to load, via the first avionics device, a portion of the at least one transmission into a flight plan of the first avionics device;

determining, via the first avionics device, if the load was successful;

generating, via the first avionics device, a status message related thereto; and periodically outputting, via the first avionics device, groups of data including a sequence number and a status message related to the sequence number.

16. The non-transitory computer readable medium of claim 15, further comprising providing, via transmission of at least a subset of the set of conforming data frames to the data network, a description with the sequence number.

17. The non-transitory computer readable medium of claim 15, further comprising:

if the attempt to load is unsuccessful, predicting, via the first avionics device, a flight plan with unloaded data; and providing, via first avionics device, the status message including results for the predicted flight plan.

18. The non-transitory computer readable medium of claim 15, further comprising providing, via the first avionics device, the status message with one or more error messages.

19. The non-transitory computer readable medium of claim 15, further comprising receiving, at the first avionics device, an edit to the flight plan, and providing, via the first avionics device, a downlink to the second avionics device based on the edit to the flight plan.

20. The non-transitory computer readable medium of claim 15, further comprising transmitting, via the first avionics device, a version counter either periodically or upon request of the second avionics device.

* * * * *